United States Patent
Yeh et al.

(10) Patent No.: US 8,369,413 B2
(45) Date of Patent: Feb. 5, 2013

(54) TRANSPORT STREAM PROCESSING SYSTEM AND RELATED METHOD THEREOF

(75) Inventors: You-Min Yeh, Chi-Lung (TW); Chin-Wang Yeh, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 407 days.

(21) Appl. No.: 12/428,520

(22) Filed: Apr. 23, 2009

(65) Prior Publication Data

US 2010/0272186 A1    Oct. 28, 2010

(51) Int. Cl.
*H04N 11/02* (2006.01)
*H04N 7/26* (2006.01)

(52) U.S. Cl. .................................. 375/240.25
(58) Field of Classification Search .................. None
See application file for complete search history.

(56) References Cited

U.S. PATENT DOCUMENTS

| | | | | |
|---|---|---|---|---|
| 6,826,185 B1 * | 11/2004 | Montanaro et al. | ........ | 370/395.1 |
| 7,000,246 B1 * | 2/2006 | Takao | ........................... | 725/141 |
| 7,127,004 B1 * | 10/2006 | Sonning et al. | ............... | 375/295 |
| 7,359,441 B2 * | 4/2008 | Yamada et al. | .......... | 375/240.25 |
| 2003/0177492 A1 * | 9/2003 | Kanou | ............................. | 725/39 |
| 2004/0096188 A1 * | 5/2004 | Kageyama | ....................... | 386/52 |
| 2006/0070106 A1 * | 3/2006 | Kitazato | ......................... | 725/88 |
| 2006/0269221 A1 * | 11/2006 | Hashimoto et al. | ............. | 386/68 |
| 2009/0180753 A1 * | 7/2009 | Kitazato | ......................... | 386/83 |

* cited by examiner

*Primary Examiner* — Thai Tran
*Assistant Examiner* — Sunghyoun Park
(74) *Attorney, Agent, or Firm* — McClure, Qualey & Rodack, LLP

(57) ABSTRACT

A transport stream processing system capable of recording and playing back a transport stream carrying a plurality of transport stream packets is provided, and includes: a first memory unit storing a plurality of sets of control words; a packet identifier filter acquiring a set of control words according to a packet identifier value of a transport stream packet and configuring an indicator to indicate whether the transport stream packet is for a recording or a playback operation; a second memory unit storing a plurality of data structures, wherein each data structure corresponds to an index number of each set of control words; and a processor determining whether the recording or playback operation for the transport stream packet is performed for the transport stream packet according to the indicator, retrieving a data structure according to the index number corresponding to the acquired set of control words and performing the operation accordingly.

19 Claims, 4 Drawing Sheets

TRANSPORT STREAM PROCESSING SYSTEM AND RELATED METHOD THEREOF

BACKGROUND

1. Technical Field

The disclosed embodiments relate to transport stream processing systems, and more particularly to a transport stream processing system that flexibly de-multiplexes a transport stream.

2. Description of the Related Art

As techniques for data compression and image processing rapidly improved, digital television with recording and playing back functions are becoming popular. In a conventional transport stream processing system, signals are transmitted as a series of packets that form a transport stream. The packets for generating the transport stream are referred to as transport stream packets.

Typically, the conventional transport stream processing system utilizes different dedicated hardware components to deal with different types of transport stream packets respectively for recording or playback functions. During a playback process, each transport stream packet contains information, such as a packet identifier (PID) value, data type or display information, to indicate which set of supplied control words needs to be employed as a current set of control words. Further, during a recording process, unlike the playback process, each transport stream packet is determined to be discarded or recorded according to the packet identifier value. Some extra information, such as decryption key information or start code information also needs to be transmitted via the control words allowing processing to be preformed on each transport stream packet. Because dedicated hardware is required, the use of different dedicated hardware architecturally sacrifices design flexibility and substantially increases manufacturing costs.

Therefore, a cost-effective and efficient integrated transport stream recording and playback system capable of processing transport stream packets respectively for recording and playback is desired.

BRIEF SUMMARY

An exemplary transport stream processing system is provided. The transport stream processing system is capable of recording and playing back a transport stream carrying a plurality of transport stream packets. Each transport stream packet comprises a packet identifier value. The transport stream processing system comprises a first memory unit, a packet identifier filter, a second memory unit, and a processor. The first memory unit stores a plurality of sets of control words. Each set of control words corresponds to an index number and a designated identifier value. The packet identifier filter receives a transport stream packet, acquires a set of control words from the first memory unit according to the packet identifier value of the received transport stream packet and configures an indicator to indicate that the received transport stream packet is provided for a recording operation or a playback operation. The designated identifier value corresponding to the acquired set of control words matches the packet identifier value of the received transport stream packet. The second memory unit stores a plurality of data structures, wherein each data structure corresponds to the index number. The processor, coupled to the second memory unit and the packet identifier filter, determines whether the recording operation or the playback operation is performed for the received transport stream packet according to the indicator, retrieves a data structure from the second memory unit according to the index number corresponding to the acquired set of control words and performs the operation for the received transport stream packet according to the determination result, the acquired set of control words and the retrieved data structure.

Another embodiment of the invention provides a transport stream processing method for a transport stream processing system capable of recording and playing back a transport stream carrying a plurality of transport stream packet, wherein each transport stream packet comprises a packet identifier value. A transport stream packet is received. A set of control words corresponding to an index number and a designated identifier value is acquired from a first memory unit according to the packet identifier value of the received transport stream packet. An indicator is configured to indicate that the received transport stream packet is provided for a recording operation or a playback operation. The designated identifier value corresponding to the acquired set of control words matches the packet identifier value of the received transport stream packet. A data structure is then retrieved according to the index number corresponding to the acquired set of control words. Thus, the operation for the transport stream packet is performed according to the configured indicator, the acquired set of control words and the retrieved data structure.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

Figure 1:
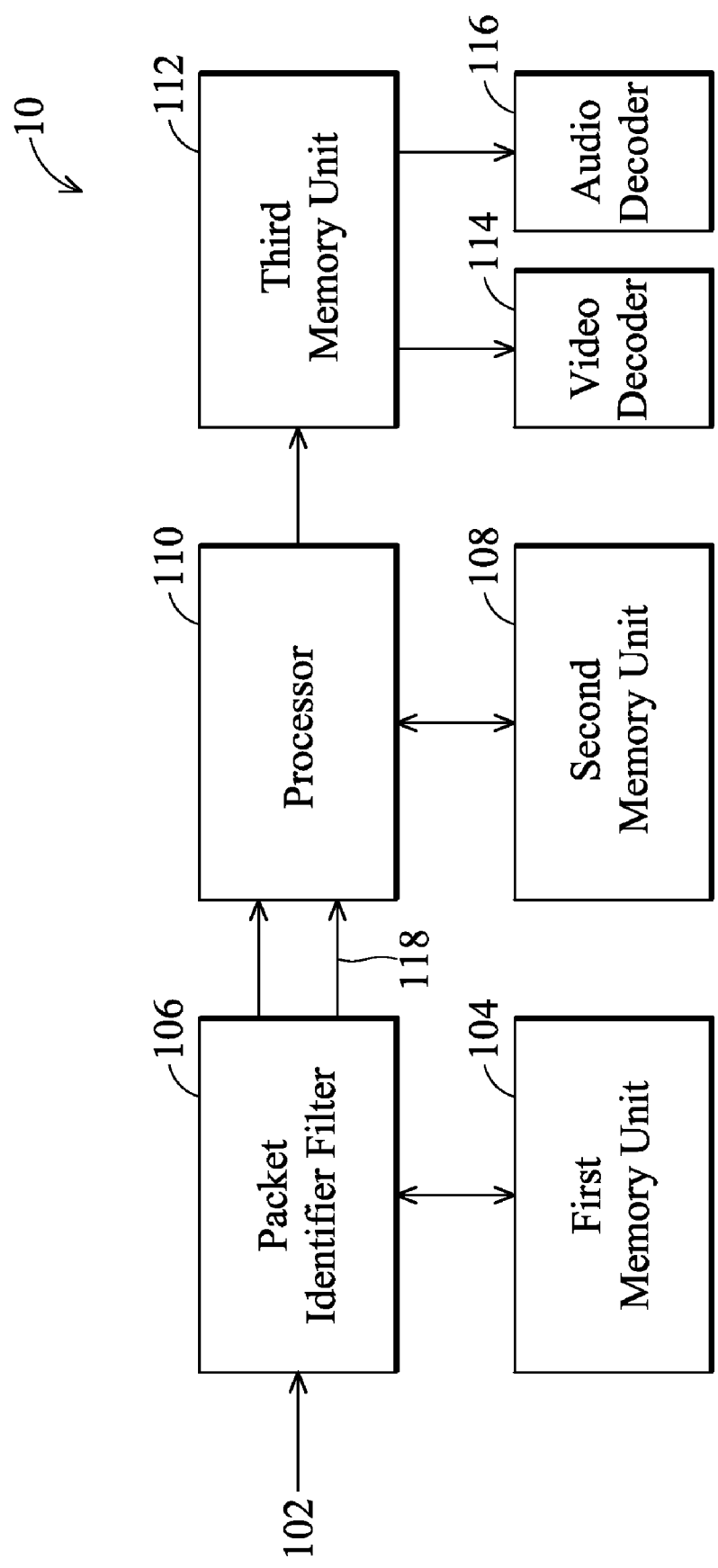
FIG. 1 is a block diagram illustrating a transport stream processing system according to an embodiment of the invention.

In the following detailed description, for purposes of explanation, numerous specific details are set forth in order to provide a thorough understanding of the present invention. It will be apparent, however, that the present invention may be practiced without these specific details. In other instances, well-known structures and devices are schematically shown in order to simplify the drawing.

FIG. 1 is a block diagram illustrating a transport stream processing system 10 capable of recording and playing back a transport stream according to an embodiment of the invention. The transport stream processing system 10 processes the transport stream carrying a plurality of transport stream packets for recording or playback, wherein each transport stream packet from a tuner, a demodulator or other playback sources may comprise a packet identifier (PID) value provided for identifying and determining the content of information stored therein, such as video information, audio information or other data information.

As shown in FIG. 1, the transport stream processing system 10 comprises a first memory unit 104, a packet identifier filter 106, a second memory unit 108 and a processor 110. The first memory unit 104 stores a plurality of sets of control words. Each set of control words corresponds to an index number and a designated identifier value. Each designated identifier value is a unique number associating attributes of each transport stream packet with the corresponding set of control words.

During operation, when receiving a transport stream packet 102, the packet identifier filter 106 acquires a set of control words from the first memory unit 104 according to the packet identifier value of the transport stream packet 102. For example, the packet identifier filter 106 conducts a search of the plurality of sets of control words in the first memory unit 104 so as to locate a designated identifier value for the set of control words matching the packet identifier value of the transport stream packet 102. Further, an indicator 118 is configured to indicate that the transport stream packet 102 is provided for a recording operation or a playback operation.

Moreover, the processor 110, coupled to the second memory unit 108 and the packet identifier filter 106, determines whether the recording operation or the playback operation is being performed according to the indicator 118. The second memory unit 108 stores a plurality of data structure indicating required processing or parameters for further processing for a transport stream packet, wherein each entry of the data structures corresponds to the index number. The processor 110 then retrieves a data structure according to the index number corresponding to the set of control words. With the data structure, the processor 110 performs the operation for the transport stream packet 102 according to the determination result, the acquired set of control words and the retrieved data structure.

The detailed description of determining the set of control words and a corresponding data structure will now be described in the following with reference to FIGS. 2 and 3.

Figure 2:
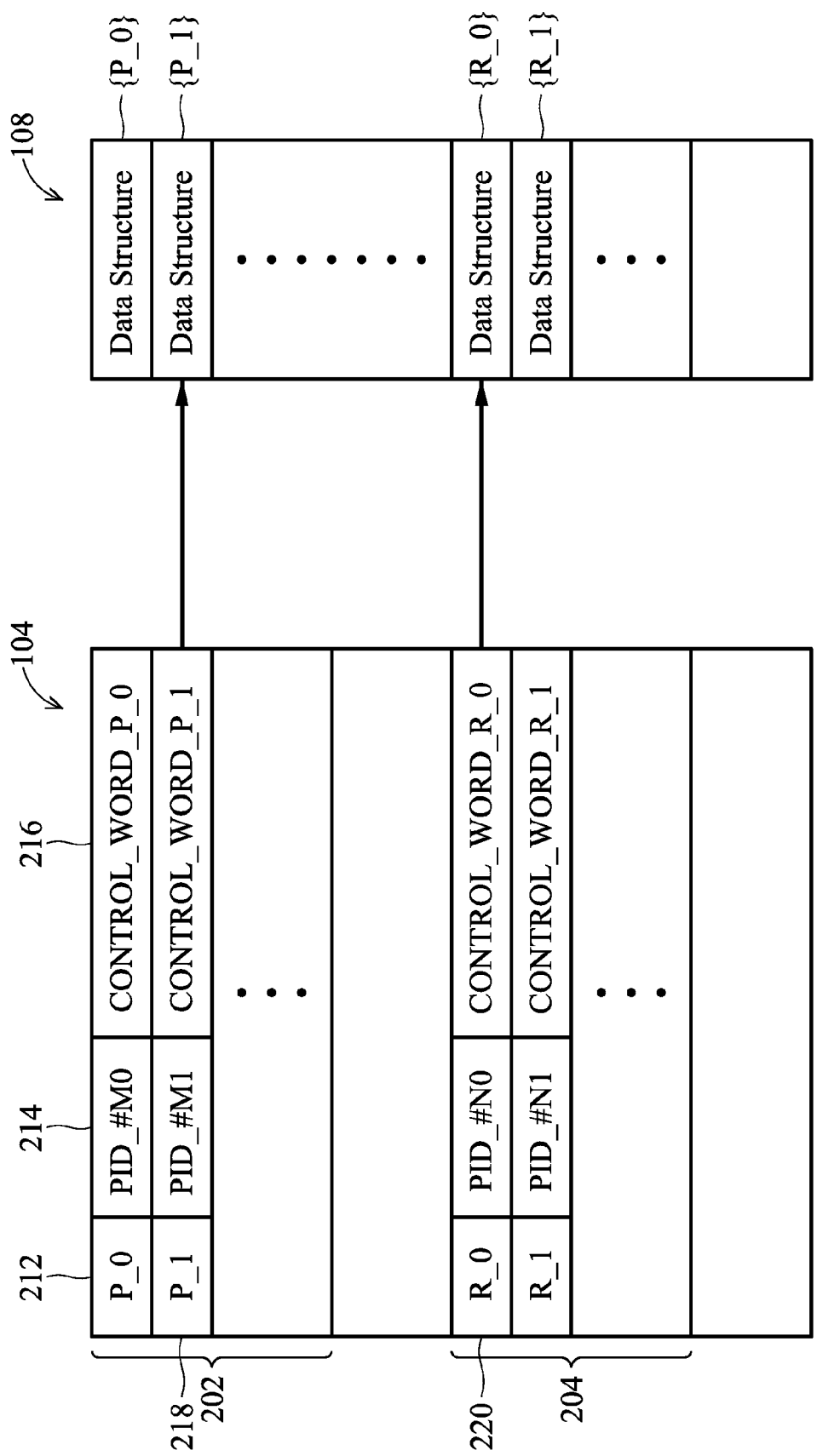
FIG. 2 depicts an exemplary memory allocation of the first memory unit and the second memory unit in FIG. 1 according the embodiment of to the invention.

FIG. 2 depicts an exemplary memory allocation of the first memory unit 104 and the second memory unit 108 in FIG. 1 according to the invention. As mentioned above, each set of control words 216, such as CONTROL_WORD_P_0, corresponds to an index number 212 and a designated identifier value 214, such as P_0 and PID_#M0. As shown in FIG. 2, the first memory unit 104 stores a playback table 202 and a recording table 204 respectively for the recording operation and the playback operation. In this embodiment, the playback table 202 and the recording table 204 are set to be located in two different banks. More specifically, each entry of the playback table 202 and the recording table 204 comprises a set of control words 216 and its corresponding index number 212 and designated identifier value 214.

In one embodiment, it is assumed that the packet identifier filter 106 receives one transport stream packet 102 with the packet identifier value PID_#N0 for the recording operation. The packet identifier filter 106 sequentially searches the playback table 202 in one bank and the recording table 204 in another bank. When a valid match is found in either bank, the corresponding set of control words is transmitted. According to this embodiment, a matching entry 220 indicative of the acquired set of control words CONTROL_WORD_R_0 is found and transmitted because the designated identifier value 214 corresponding to the set of control words CONTROL_WORD_R_0 is equal to the packet identifier value PID_#N0 of the transport stream packet 102. The index number R_0 corresponding to the set of control words CONTROL_WORD_R_0 is accordingly obtained. Next, the indicator 118 as shown in FIG. 1 is configured to indicate that the transport stream packet 102 is provided for the recording operation.

Referring to FIG. 2, data structures related to the playback operation are sequentially stored in a sequence of locations within the second memory unit 108, such as the data structure {P_0}, {P_1}, etc. Also, data structures for the recording operation are separately stored in another sequence of locations within the second memory unit 108, such as the data structure {R_0}, {R_1}, etc. For example, data structures for the recording operation can be stored next to those for the playback operation, but is not limited to. It is noted that each data structure is accessed in response to a corresponding set of control words with the same index number.

From the aforementioned embodiment, the index number R_0 is then provided for the processor 110 to obtain a data structure {R_0}. As a result, the processor 110 detects video elementary stream start codes or encrypts the transport stream packet 102 before recording in accordance with the data structure {R_0} and the set of control words CONTROL_WORD_R_0.

Similarly, according to another embodiment, the packet identifier filter 106 is assumed to receive another transport stream packet 102 with the packet identifier value PID_#M1 for the playback operation. Thus, a set of control words CONTROL_WORD_P_1 and its corresponding index number P_1 are determined and assigned for the transport stream packet 102 when a matching entry 218 is found in the playback table 202 according to the packet identifier value PID_#M1. Next, the indicator 118 as shown in FIG. 1 is accordingly configured to indicate that the transport stream packet 102 is provided for the playback operation. A data structure {P_} is then retrieved from the index number P_1 by the processor 110 for the following playback operation.

Figure 3:
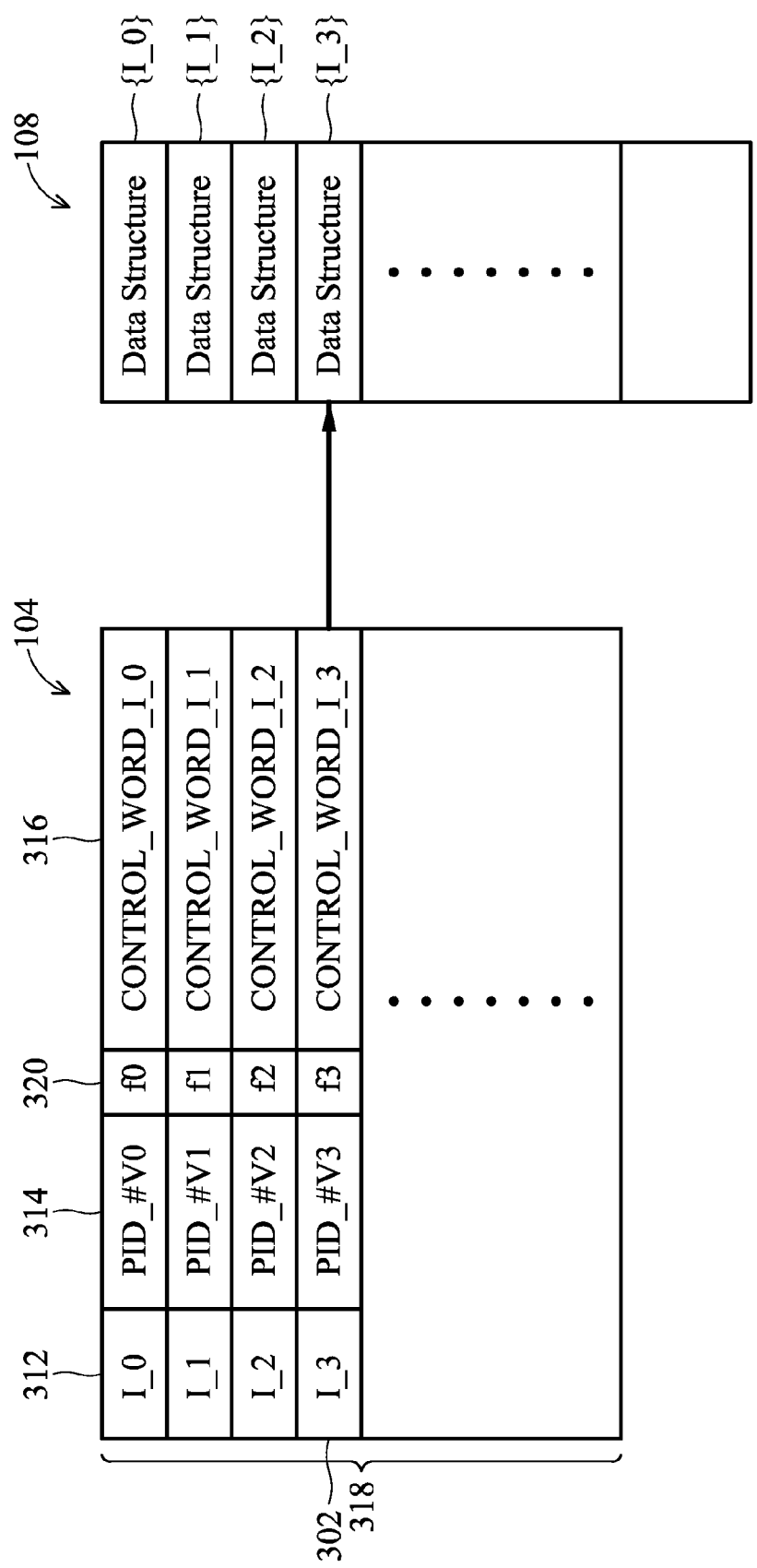
FIG. 3 depicts another exemplary memory allocation of the first memory unit and the second memory unit in FIG. 1 according the embodiment of to the invention.

FIG. 3 depicts another exemplary memory allocation of the first memory unit 104 and the second memory unit 108 in FIG. 1 according to the invention. As shown in FIG. 3, the first memory unit 104 stores a unified table 302 intended for the recording operation and the playback operation. For example, the unified table 302 may be located within one bank. Each entry of the unified table 302 comprises a set of control words 316 and its corresponding index number 312, designated identifier value 314 and flag 320. The flag 320 may be implemented in the form of two bits for respectively indicating that the corresponding set of control words 316 is provided for a recording operation, a playback operation, or both. Further, all data structures within the second memory unit 108 are provided for the recording operation and the playback operation. Each data structure may combine one or more data items respectively for the recording operation, the playback operation, or both.

For example, it is assumed that the packet identifier filter 106 receives one transport stream packet 102 with the packet identifier value PID_#V3 for the playback operation. The packet identifier value PID_#V3 is employed for searching the unified table 302. Then, a matching entry 318 is found to indicate a corresponding index number I_3, one set of control words CONTROL_WORD_I_3, and a corresponding flag f3. As described above, the index number I_3 is used to map the corresponding data structure {I_3} for further decoding and playing back. That is, in the data structure {I_3}, some items associated with the playback operation may be correspondingly accessed in response to the set of control words CONTROL_WORD_I_3. The indicator 118 as shown in FIG. 1 is also configured according to the flag f3 for identifying whether or not the recording operation and the playback operation associated with the received transport stream packet 102 is activated.

Some suitable methods of combining control words for recording and playback may be employed. For example, each set of control words from the playback table 202 and the recording table 204 may be directly combined to generate a corresponding set of control words in the unified table 302, Thus, the total entries of the unified table 302 for recording and playback may comprise twice as many entries from the playback table 202 or the recording table 204. Additionally, the indicator 118 as shown in FIG. 1 is configured according to the flag 320. In this case, the indicator 118 is a two-bit indicator used to respectively identify whether or not the recording operation and the playback operation associated with the received transport stream packet 102 is activated. Also, the indicator 118 can further indicate that both the recording operation and the playback operation associated with the received transport stream packet 102 are required.

It is noted that as shown in FIG. 1, the transport stream processing system 10 further comprises a third memory unit 112, a video decoder 114 and an audio decoder 116. The third memory unit 112 is coupled to the processor 110 for storing audio elementary stream data and video elementary stream data generated therefrom according to the plurality of transport stream packets. The video decoder 114 is coupled to the third memory unit 112 for retrieving and decoding video elementary stream data stored therein and generating video sequences for display. Furthermore, the audio decoder 116 is coupled to the third memory unit 112 for retrieving and decoding the audio elementary stream data stored therein and generating audio sequences for display. More particularly, when starting the recording operation, the transport stream processing system 10 may comprise an external memory unit (not shown), such as a hard drive, for storing the recorded transport stream data.

Figure 4:
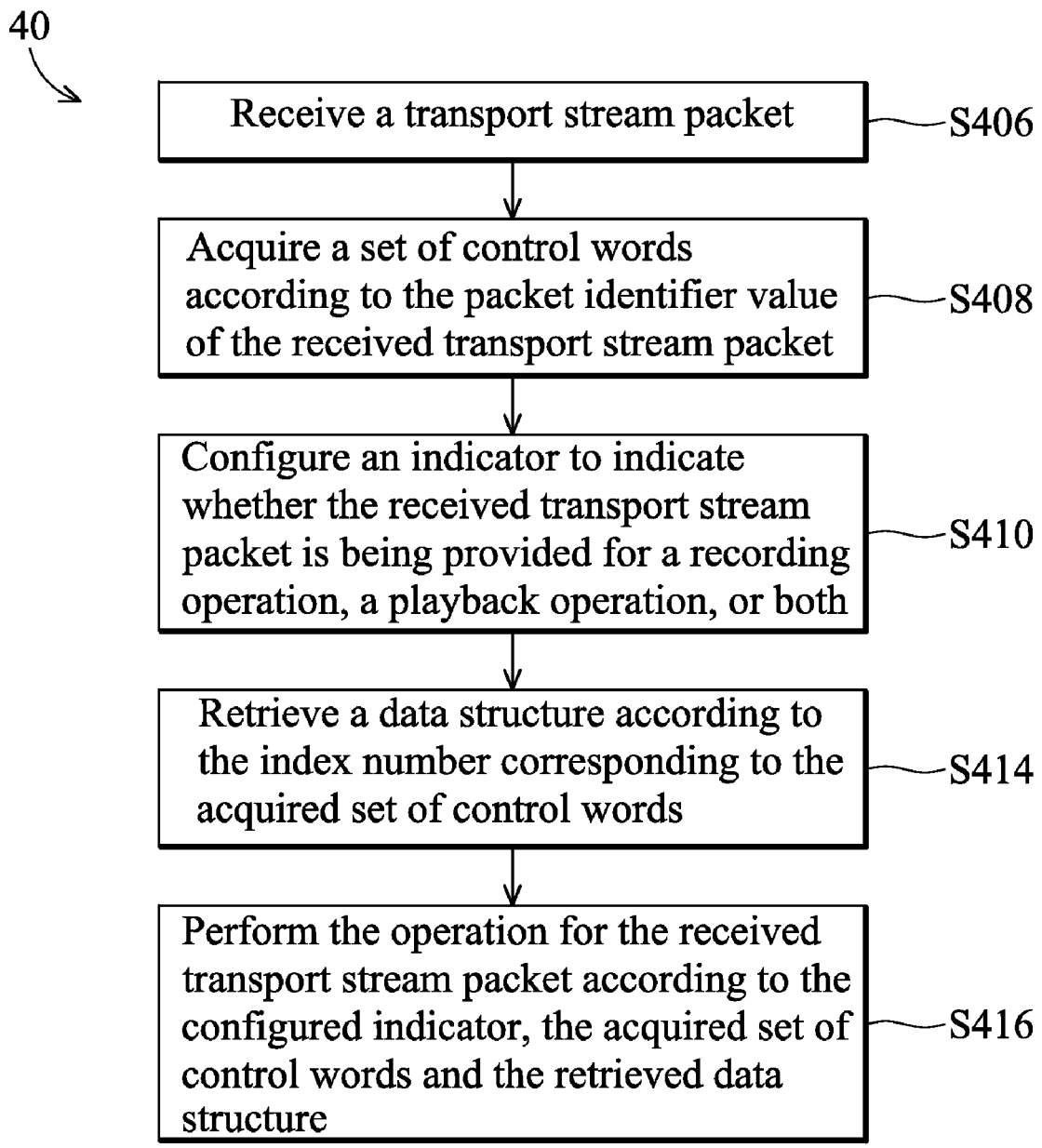
FIG. 4 is a flowchart illustrating a transport stream processing method according to another embodiment of the invention.

In view of above exemplary embodiments, a transport stream processing method 40 employed the transport stream processing system 10 can be briefly summarized using following steps shown in FIG. 4. Note that the transport stream processing method 40 is provided for the transport stream processing system to process a transport stream carrying a plurality of transport stream packets for recording and playback.

As shown in FIG. 4, a first memory unit stores a plurality of sets of control words, where each set of control words corresponds to an index number and a designated identifier value. Next, a plurality of data structures and corresponding index numbers are also stored into a second memory unit. When a transport stream packet is received (step S406), a set of control words from the first memory unit is subsequently acquired according to the packet identifier value of the received transport stream packet (step S408). More specifically, the set of control words is obtained when a match is found, wherein the designated identifier value of the acquired set of control words equals the packet identifier value of the received transport stream packet.

In addition, an indicator, such as the indicator 118 in FIG. 1, is configured to indicate whether the received transport stream packet is provided for a recording operation, a playback operation or both (step S410). The indicator can be configured according to a corresponding flag of the acquired set of control words. Following, a data structure is retrieved according to the index number corresponding to the acquired set of control words (step S414). Finally, the operation for the received transport stream packet is performed according to the configured indicator, the acquired set of control words, and the retrieved data structure (step S416).

It should be noted that if the result is substantially the same, the steps are not required to be executed in the exact order shown in FIG. 4. In addition, as a person skilled in the art can readily understand detailed operation of each step mentioned above after reading above paragraphs directed to operations of the transport stream processing system 10, further description of each step is omitted here for brevity.

Compared with the prior art, the transport stream processing system according to embodiments of the invention integrates the recording operation with the playback operation functions, without the need for costly or dedicated hardware designs. Also, configuration of control words and corresponding data structures can be dynamically adjusted to fit various information carried by transport stream packets, thereby enhancing de-multiplexing performance of the transport stream processing system.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A transport stream processing system capable of recording and playing back a transport stream carrying a plurality of transport stream packets, wherein each transport stream packet comprises a packet identifier value, comprising:
    a first memory unit for storing a plurality of sets of control words, wherein each set of control words corresponds to an index number and a designated identifier value;
    a packet identifier filter for receiving a transport stream packet, acquiring a set of control words from the first memory unit according to the packet identifier value of the received transport stream packet, and configuring an indicator to indicate that the received transport stream packet is provided for a recording operation or a playback operation, wherein the designated identifier value corresponding to the acquired set of control words matches the packet identifier value of the received transport stream packet;
    a second memory unit for storing a plurality of data structures, wherein each data structure corresponds to the index number and the plurality of data structures comprises a first plurality of data structure for the recording operation and a second plurality of data structure for the playback operation, and each data structure is retrieved in response to a corresponding set of control words with the same index number; and
    a processor coupled to the second memory unit and the packet identifier filter, for determining whether the recording operation or the playback operation is performed for the received transport stream packet according to the indicator, retrieving a data structure from the second memory unit according to the index number corresponding to the acquired set of control words and performing the operation for the received transport stream packet according to the determination result, the acquired set of control words and the retrieved data structure.

2. The transport stream processing system as claimed in claim 1, wherein the first memory unit stores a recording table for the recording operation and a playback table for the playback operation respectively set to be located in a first bank and a second bank, and each entry of the recording table and the playback table comprises a set of control words and its corresponding index number and designated identifier value.

3. The transport stream processing system as claimed in claim 2, wherein the packet identifier filter sequentially searches the recording table in the first bank and the playback table in the second bank to find a matching entry indicative of the acquired set of control words in accordance with the packet identifier value of the received transport stream packet.

4. The transport stream processing system as claimed in claim 2, wherein the plurality of data structures comprises a first plurality of data structures for the recording operation and a second plurality of data structures for the playback operation, the first plurality of data structures are stored in a first sequence of locations within the second memory unit, the second plurality of data structures are separately stored in a second sequence of locations within the second memory unit, and each data structure is retrieved in response to a corresponding set of control words with the same index number.

5. The transport stream processing system as claimed in claim 1, wherein the first memory unit stores a unified table intended for the recording operation and the playback operation and the unified table is located in a third bank, wherein each entry of the unified table comprises a set of control words and its corresponding index number, designated identifier value and flag.

6. The transport stream processing system as claimed in claim 5, wherein the packet identifier filter searches the unified table in the third bank to find a matching entry indicative of the acquired set of control words in accordance with the packet identifier value of the received transport stream packet and configures the indicator according to the corresponding flag of the acquired set of control words.

7. The transport stream processing system as claimed in claim 5, wherein the plurality of data structures are stored in a sequence of locations within the second memory unit and a item for the recording operation and the playback operation are combined into each data structure, which is retrieved in response to the corresponding index number.

8. The transport stream processing system as claimed in claim 1, wherein the processor performs the operation for the transport stream packet according to the determination result, the acquired set of control words and the retrieved data structure to generate audio elementary stream data and video elementary stream data, and the system further comprises:
a third memory unit coupled to the processor for storing the audio elementary stream data and video elementary stream data.

9. The transport stream processing system as claimed in claim 8, further comprising:
a video decoder coupled to the third memory unit for decoding the video elementary stream data and generating video sequences for display.

10. The transport stream processing system as claimed in claim 8, further comprising:
an audio decoder coupled to the third memory unit for decoding the audio elementary stream data and generating audio sequences for display.

11. A transport stream processing method for a transport stream processing system capable of recording and playing back a transport stream carrying a plurality of transport stream packets, wherein each transport stream packet comprises a packet identifier value, comprising:
receiving a transport stream packet;
acquiring a set of control words corresponding to an index number and a designated identifier value from a first memory unit according to the packet identifier value of the received transport stream packet;
configuring an indicator to indicate that the received transport stream packet is provided for a recording operation or a playback operation, wherein the designated identifier value corresponding to the acquired set of control words matches the packet identifier value of the received transport stream packet;
retrieving a data structure according to the index number corresponding to the acquired set of control words; and
performing the operation for the received transport stream packet according to configured the indicator, the acquired set of control words and the retrieved data structure;
wherein the plurality of data structures comprises a first plurality of data structures for the recording operation and a second plurality of data structures for the playback operation and each data structure is retrieved in response to a corresponding set of control words with the same index number.

12. The transport stream processing method as claimed in claim 11, wherein the first memory unit stores a recording table for the recording operation and a playback table for the playback operation respectively set to be located in a first bank and a second bank, and each entry of the recording table and the playback table comprises a set of control words and its corresponding index number and designated identifier value.

13. The transport stream processing method as claimed in claim 12, wherein the step of acquiring the set of control words comprises:
sequentially searching the recording table in the first bank and the playback table in the second bank to find a matching entry indicative of the set of control words in accordance with the packet identifier value of the received transport stream packet.

14. The transport stream processing method as claimed in claim 12, wherein the first plurality of data structures are stored in a first sequence of locations within a second memory unit, the second plurality of data structures are separately stored in a second sequence of locations within the second memory unit.

15. The transport stream processing method as claimed in claim 11, wherein the first memory unit stores a unified table intended for the recording operation and the playback operation and the unified table is located in a third bank, wherein each entry of the unified table comprises a set of control words and its corresponding index number, designated identifier value and flag.

16. The transport stream processing method as claimed in claim 15, wherein the step of acquiring the set of control words comprises:
searching the unified table in the third bank to find a matching entry indicative of the acquired set of control words in accordance with the packet identifier value of the received transport stream packet; and
configuring the indicator according to the corresponding flag of the acquired set of control words.

17. The transport stream processing method as claimed in claim 15, wherein the plurality of data structures are stored in a sequence of locations within a second memory unit and a item for the recording operation and the playback operation are combined into each data structure, which is retrieved in response to the corresponding index number.

18. The transport stream processing method as claimed in claim 11, further comprising:
generating an audio elementary stream data and video elementary stream data according to the plurality of transport stream packets; and
storing the audio elementary stream data and video elementary stream data into a third memory unit.

19. The transport stream processing method as claimed in claim 18, further comprising:
decoding the video elementary stream data to generate video sequences for display; and
decoding the audio elementary stream data to generate audio sequences for display.

* * * * *